United States Patent Office 3,446,493
Patented May 27, 1969

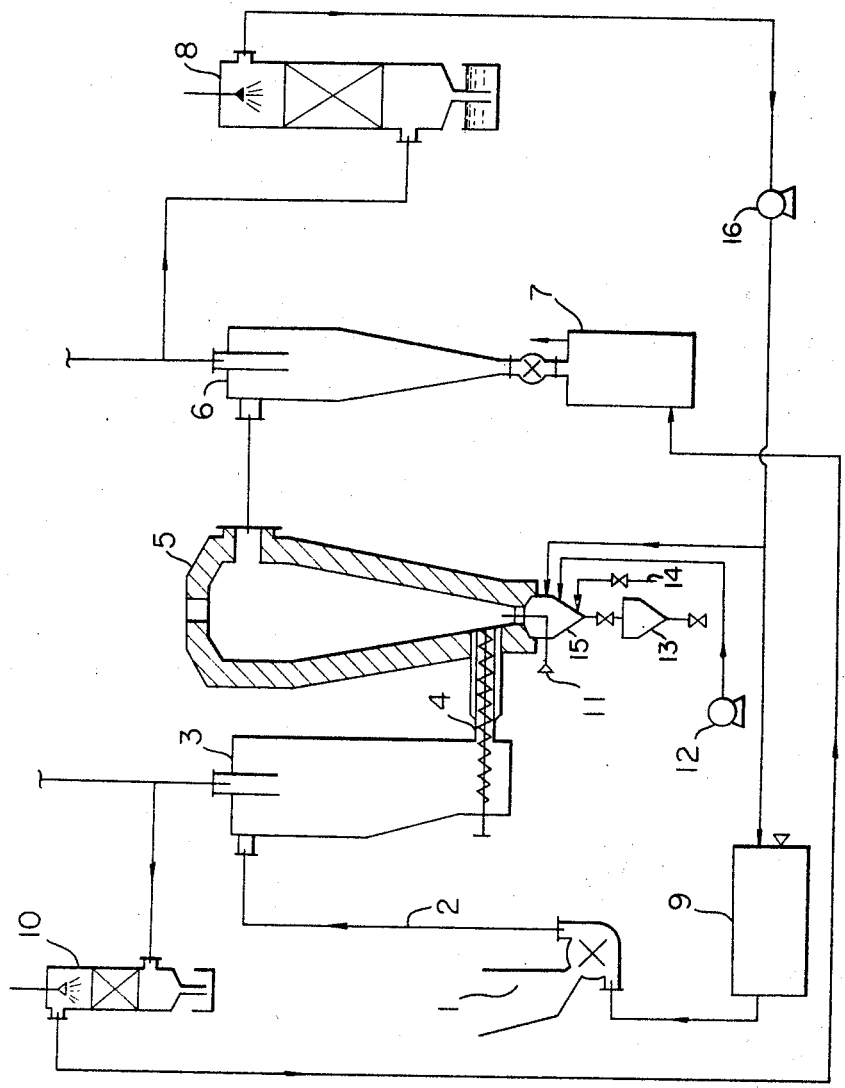

3,446,493
HIGH SPEED CONTINUOUS METHOD AND APPARATUS FOR CARBONIZATION AND ACTIVATION OF ORGANIC MATERIAL
Orio Imai, Sagamihara-shi, and Yoshiro Usuba and Shozo Ito, Funabashi-chi, Japan, assignors to Mifuji Iron Works Co., Ltd., Tokyo, Japan, a company of Japan
Filed June 6, 1967, Ser. No. 644,023
Int. Cl. C01b *31/08;* C10l *5/40*
U.S. Cl. 263—36          12 Claims

ABSTRACT OF THE DISCLOSURE

An improved high speed continuous method for carbonizing organic material and an apparatus for carrying out the method. The organic material such as lignite, coal waste and forest mill waste are dried by passing through a flash dryer and carbonized or activated within an internal heating furance of inverted cone shape having a bottom box disposed thereunder for mixing the recycle gas with air or air and steam. The recycle gas fluidifies the organic material burnt within the furnace. The carbonized product is discharged to a product receiver and liquid byproduct is drained off the bottom box into a draining off means. The inert gas produced by a gas washer for treating the discharged gas from the flash drier is fed to the product receiver for cooling and extinguishing the product.

---

The present invention relates to an improved method and apparatus for carbonizing waste materials, more particularly relates to an improved continuous method and apparatus for carbonizing waste materials with high yield at high operation speed.

Lignite, brown coal, subbituminous coal, noncoking coal and coal waste; forest mill waste such as bark waste, chipper waste and sawdust and agricultural waste such as rice or bean shaff and seed of fruit (hereinafter called "organic material") are being utilized chiefly for charcoal manufacture by burning or a simple carbonizing operation. In the conventional waste material carbonization method mentioned above, the carbonization is carried out entirely with the horizontal or vertical smoking furnace, but the speed of carbonizing is very slow and it is almost impossible to control the carbonizing condition as carbonization is by dry distillation by so-called natural draft. Further, the carbonization of the organic material is operated by the batch system which requires considerable number of days for cooling the product in order to remove the product from the furnace. Therefore, it is difficult to produce carbonized product having uniform quality and the carbonized products of the above-mentioned conventional method are not suitable for use as industrial carbon materials in the metallurgical or chemical industry fields.

The principal object of the present invention is to provide an improved continuous method and apparatus for carbonizing organic materials with high yield at high operation speed.

The other object of the invention is to provide an improved method and apparatus for producing industrial carbon having uniform quality from organic materials continuously.

Further object of the invention is to provide an improved method and apparatus for carbonizing organic material economically by circulating volatile gas generated in the distillation furnace.

Further objects and advantages of the present invention will be apparent from the following description, reference being had to the accompanying drawings where- in a preferred embodiment of the present invention is clearly shown.

The figure is a section skeleton of an embodiment of the carbonizing apparatus of the invention.

Generally, the forest waste materials contain 70 to 80% of water, therefore, the water contained in the organic material is removed mechanically, pulverized if required and fed to a hopper 1. The organic material is transferred from the hopper 1 to a flash dryer 2 where hot exhaust gas is fed to dry the material. The exhaust gas is generated in the mixed combustion furnace 9 by feeding distilled gas or activation gas (both of these are referred to as recycle) and additional burning of the recycle gas. The dried waste material delivered from the flash dryer 2 is conveyed to a collection means comprising at least one set of cyclone and collected into the cyclone hoppers 3. The temperature of hot gas supplied to the flash dryer 2 can be adjusted by the firing temperature of the waste material but it is preferable to maintain it at a range of 300±100° C. The material is carried by the hot exhaust gas flow to a cyclone hopper 3. The dried material collected in the cyclone hopper 3 is fed to a high speed internal heating furnace 5 by a screw conveyor 4 or other carrying means disposed at the bottom portion of the cyclone hopper 3. The recycle gas is mixed together with a suitable quantity of air or of air and steam within a bottom box. The mixed gas is fed from the bottom box 15 into the bottom of the furnace 5 and burned therein. The material supplied to the furnace 5 is fluidified in mixed condition with the mixed gas and continuously carbonized or activated in a short time while passing through the furnace 5. Air is fed to the bottom box 15 by a blower 12 disposed under the furnace 5. The treating temperature of the furnace 5 can be adjusted by the condition of gas fed to it, that is, the treating temperature of the furnace 5 is maintained in a range of 250 to 1,100° C. by the mixing ratio of the recycle gas, air and steam, and by the condition of preheating operation.

The quantity of air fed to the furnace can be reduced by returning recycle gas to the furnace 5, the required heat supply for carbonization and activation of the material can be operated easily, consequently, the temperature control of the furnace 5 can be carried out easily, the yield of the carbonization and activation is increased, and the quality of product is improved. For example, if the distillation temperature is 700° C., the yield of the carbonization in case of gas circulation is increased to 25% while that in case of air blowing only is 21%. Concerning the quality of product in case of gas circulation, the reactivity of the carbonized material is improved by over 10% when compared with the case of air blowing only. Compared with the other non-recycle gas process, the treating capacity of the furnace 5 can be easily varied by this recycle gas process.

The furnace 5 is ignited by an oil burner or a gas burner 11, or by throwing in burning solid fuel into the bottom portion of the furnace 5 and after the furnace 5 is fired once, it is not necessary to feed any fuel from the outside. A small quantity of auxiliary burning material is required for maintaining the furnace temperature only at the start of operation.

It is desirably to use a furnace 5 having the shape of an inverted cone so that materials of a wide range of particle size can be fluidized simultaneously. A fire grate made of heat resistant material may be disposed at the narrow bottom portion of the furnace 5 or the grate may be omitted. The product of the furnace 5, that is, carbonized coke or activated carbon is collected by a collecting means comprising at least one cyclone 6 and then this is carried to a product receiver 7. In the product receiver 7, the product is quenched and then cooled by inert gas in order to prevent refiring. The quenched and cooled product is delivered from the product receiver 7 by a screw conveyor disposed to the receiver 7.

When some foreign matters such as stone or pieces of iron are contained in the waste material, such foreign matters are removed from the furnace 5 through a bottom box 15 during the operation. The gas circulation continuously accelerates generation of gas by the exothermic reaction of the raw material. The material is distilled by the burning of the volatile components in it and the recycle gas, consequently, the final product can be obtained from the inert gas while maintaining its shape in the same condition as that of the raw material by which the yield of the carbonization is improved.

The specific gravity of the carbonized product differs considerably from that of the raw waste material so that the carbonized product is delivered by the mixed gas composed of air, the recycle gas and the distilled gas at the passing speed of the mixed gas in the furnace 5, therefore, carbonized product having uniform quality can be produced.

The distilled gas and activation gas after separation of the product in the cyclone 6 generally has a heat value of 600 to 1,200 kcal./m.³. Consequently, all or some of the above-mentioned separated gas is fed to a gas cleaner 8, from which it is fed to the high speed internal heating furnace 5. The balance of the gas is fed to the mixed combustion furnace 9 and is used as a heating source for dryer 2. A blower 16 is disposed to an intermediate portion of a connecting conduit between the gas cleaner 8 and the mixed combustion furnace 9 to feed the balance of the gas to the furnace 9. A portion of the discharged gas from the dryer 2 is washed and cooled by a gas washer 10 and then inert gas from the washer 10 is fed to the product receiver 7. In the above-mentioned operation, some byproducts such as wood acetic acid and wood tar can be easily extracted during the carbonization operating at high temperature and drained off the bottom of the furnaces into a draining-off means 13 located under the bottom box 15. Moreover, an activated, carbonized product can be produced by feeding steam or some activation agent into the furnace 5 through a steam feeding means 14 and the bottom box 15 when required.

While the invention has been described in conjuction with certain embodiments thereof, it is to be understood that various modifications and changes may be made without departing from the spirit and scope of the invention.

What is claimed is:
1. An improved high speed continuous process for carbonizing an organic material comprising mixing recycle gas with air; fluidly mixing said gas-air mixture with said organic material; burning said gas-air organic mixture at a temperature between 250 to 1100° C.; whereby said organic material will carbonize and a portion of said recycle gas will remain unburnt; collecting said carbonized material; and recycling said unburnt gas into said first mixing step.

2. A process as in claim 1 further comprising mixing steam with said gas-air mixture.

3. A process as in claim 1 further comprising drying said organic material by moving said organic material by a portion of said recycle gas prior to said first mixing step at a temperature of 300±100° C. whereby said organic material is dried without distillation.

4. A process as in claim 3 further comprising washing gas exhausted from said drying step whereby said exhausted gas is rendered inert and thereafter mixing said washed gas with said carbonized material; whereby said carbonized material is quenched and cooled to prevent refining.

5. A process as in claim 1 further comprising cleaning said recycle gas before recycling.

6. An improved high speed continuous apparatus for carbonizing an organic material comprising first means for mixing recycle gas with air; second means for mixing fluidly said gas-air mixture with said organic material; means for burning said gas-air-organic mixture at a temperature between 250 to 1100° C. whereby said organic material will carbonize and a portion of said recycle gas will remain unburnt; means for collecting said carbonized material; and means for recycling said unburnt gas into said first mixing means.

7. An apparatus as in claim 6 further comprising third means for mixing steam with said gas-air mixture.

8. An apparatus as in claim 7 wherein said burning means and said first, second and third mixing means comprises an inverted cone shaped furnace and a bottom box in said furnace having at least 3 inputs for air, steam and recycle gas respectively said box serving as said first and third mixing means, the lower portion of said furnace serving as said second mixing means and the upper portion as said burning means.

9. An apparatus as in claim 6 further comprising means for drying and moving said organic material by a portion of said recycle gas prior to said first mixing means at a temperature of 300±100° C. whereby said organic material is dried without distillation.

10. A process as in claim 9 wherein said drying means comprises a flash dryer.

11. An apparatus as in claim 9 further comprising means for washing gas exhausted from said drying means whereby said exhausted gas is redried inert and thereafter fourth means for mixing said washed gas with said carbonized material, whereby said carbonized material is quenched and cooled to prevent refining.

12. An apparatus as in claim 11 wherein said washing means comprises a gas washer, said collecting means comprises a cyclone hopper and said fourth mixing means comprises a product receiver located below said cyclone hopper.

References Cited

UNITED STATES PATENTS

| 2,666,269 | 1/1954 | Parry. |
| 3,212,197 | 10/1965 | Crawford _____ 34—10 |
| 3,267,890 | 8/1966 | Zinn et al. _____ 110—18 |
| 3,289,617 | 12/1966 | Simpson _____ 110—18 |

JOHN J. CAMBY, Primary Examiner.

U.S. Cl. X.R.

110—18